Aug. 18, 1936.  E. BUGATTI  2,051,022
BODYWORK
Filed March 23, 1933
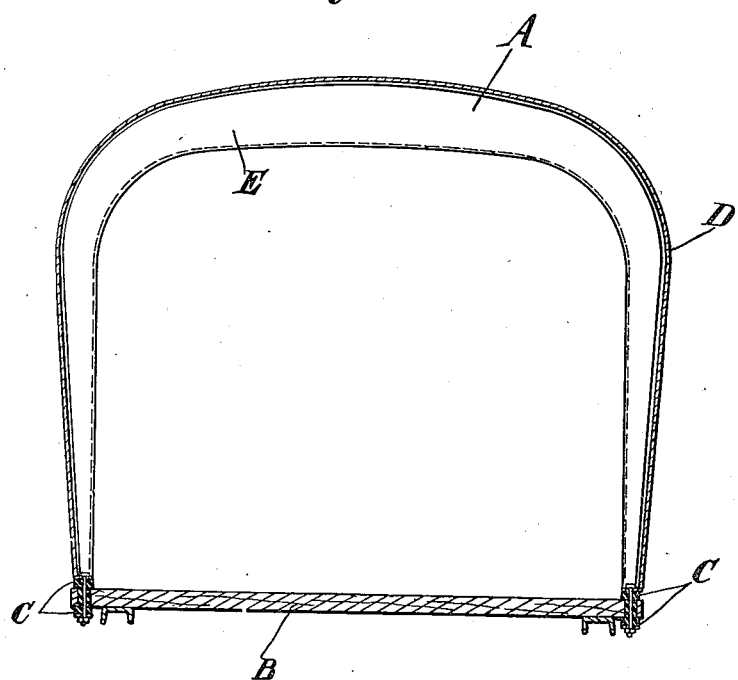
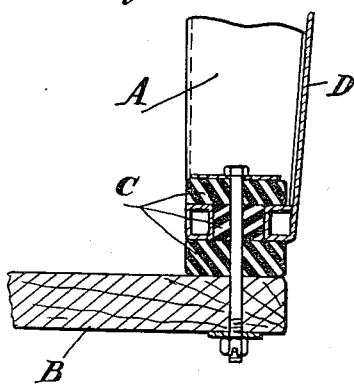 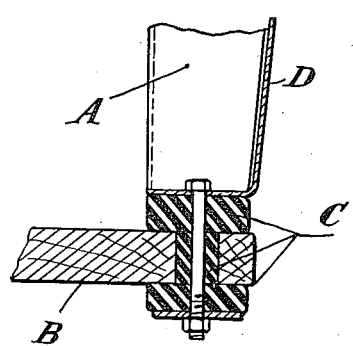
Inventor:-
Ettore Bugatti
By Mauro & Lewis
Attorney Patented Aug. 18, 1936

2,051,022

UNITED STATES PATENT OFFICE 2,051,022

BODYWORK

Ettore Bugatti, Molsheim, France

Application March 23, 1933, Serial No. 662,381
In France April 12, 1932

1 Claim. (Cl. 296—104)

The object of the present invention is to provide a vehicle bodywork which may comprise the same constituted elements as ordinary bodyworks, but the essential feature of which consists in that the elements that form the floor are connected to the group of the upper elements through elastic and anti-vibration means for the double purpose of obtaining an extremely light construction, and protecting the upper part of the bodywork against all noises and vibrations that might have been transmitted from the frame to the floor of the bodywork. This arrangement makes it possible to utilize a floor which is not rigid in its longitudinal direction, and which may therefore be both very light and flexible. This floor has got to be rigid only in the transversal direction so as to act as a support and a bracing for the upper part of the bodywork.

Said upper part which is now very little subjected to the deformations of the frame and therefore of the floor, is built in a light and flexible manner, and is reinforced transversely merely through curved members without any cross piece so as to rest on the floor in the manner of an arch.

The bodywork thus made will be advantageously fixed to the frame through the means described in the French patent filed October 27, 1931, and in the additional patent filed December 5, 1931, by Jean Bugatti for "Elastic system for fixing the bodywork to the frame of a vehicle such as a motor car, railway car, etc.," which have matured into French Patent No. 725,351 and French Patent Addition No. 41,087, respectively.

A preferred embodiment of my invention will be hereinafter described with respect to the appended drawing given merely by way of example, and in which:

Fig. 1 is a diagrammatical cross sectional view of an embodiment of vehicle bodywork according to my invention;

Figs. 2 and 3 show two different embodiments of the means for connecting the upper part of the bodywork to the floor.

The body of the vehicle comprises a group of upper elements A including an outer covering D forming both the roofs and the lateral walls of the body, and bent members E having their maximum modulus of resistance at the top and their minimum modulus of resistance at the feet of the arch thus formed. Preferably, no cross pieces are provided between the arch-shaped members above the level of the floor.

Floor B is made of metal, wood or any other material, without any rigidity in the longitudinal direction of the body, but which acts as a cross piece supporting the upper portion of the body.

Between portions A and B of the bodywork, there are inserted elastic and anti-vibration means C, the function of which is on the one hand to elastically support the weight of the body, and on the other hand, to maintain it in position on the floor, while permitting said floor to be deformed with respect to the upper part without the noise or vibrations of the floor being transmitted to said upper part. Elastic means C might be of any suitable shape or section. They may consist of a single piece or of several rings or bands piled upon one another; such means have been shown in Figs. 2 and 3.

As shown in Fig. 2, the elastic means comprise three elements C resting on floor B, and through which extends a bolt serving both to maintain said elements C in position, and to secure parts A and B of the bodywork thereto.

The embodiment of Fig. 3 is analogous, but instead of having the three elements C disposed above the floor, one of them extends through said floor and the other two are disposed respectively over and under said floor.

While I have described what I deem to be practical and efficient embodiments of my invention, it should be well understood that I do not wish to be limited thereto, as there might be changes made in the arrangement, disposition and form of the parts without departing from the principle of my invention as comprehended within the scope of the appended claim.

What I claim is:

In a vehicle of the type described having a bodywork and a floor adapted to be deformed in the longitudinal direction of the vehicle and rigid in the transverse direction thereof, the combination of a plurality of members forming the upper part of the bodywork, and a yielding connection extending directly between said bodywork and said floor, said connection including a first rubber element applied against the upper face of the edge of said floor, a second rubber element of smaller width superposed to the first mentioned one, and a third rubber element of a width substantially equal to that of the first mentioned rubber element superposed to the second mentioned one, a flange carried by the lower part of each of said bodywork members said flange being of a thickness substantially equal to that of said second mentioned rubber element and being provided with a hole so as to surround said second mentioned rubber element and to be tightly clasped between the first and third mentioned rubber elements, and a bolt extending through said three rubber elements and the floor for fixing said members to the floor.

ETTORE BUGATTI.